Jan. 30, 1968  J. GAYNOR ETAL  3,366,480
INFORMATION RECORDING SYSTEM COMPRISING REVERSIBLE COLOR IMAGE
Filed Jan. 24, 1963
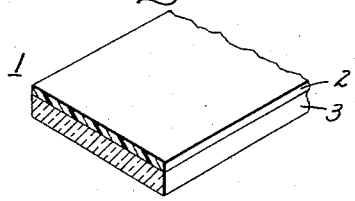
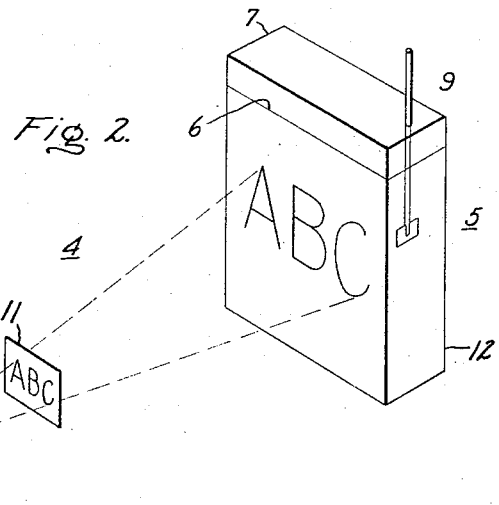
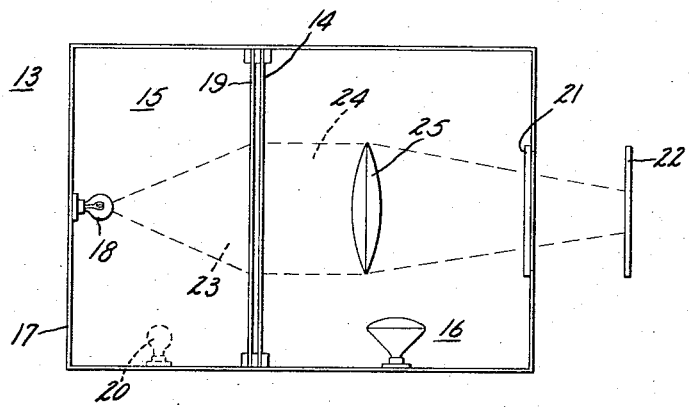
Inventors:
Joseph Gaynor,
Max Metlay,
Gordon J. Sewell,
by Paul A. Frank
Their Attorney.

United States Patent Office 3,366,480
Patented Jan. 30, 1968

3,366,480
INFORMATION RECORDING SYSTEM COMPRISING REVERSIBLE COLOR IMAGE
Joseph Gaynor and Max Metlay, Schenectady, and Gordon J. Sewell, Albany, N.Y., assignors to General Electric Company, a corporation of New York
Filed Jan. 24, 1963, Ser. No. 253,732
6 Claims. (Cl. 96—48)

This invention relates generally to the preparation of a reversible color image in liquid or solid recording media upon exposure to activating radiation. More particularly, the present invention relates to a system for producing an erasable color image in either a liquid or solid recording member for repeated recording with the same medium. Specifically, this invention pertains to preparation of an erasable color image with activating radiation and to erasure of the image for restoration of the recording medium.

Various information recording systems are known for producing a color image directly upon exposure of a recording member to activating radiation in the image pattern to be recorded. The image is produced by localized photochemical conversion of light-sensitive agents to chromophoric products in portions of the recording member receiving the radiation. In the past, an image produced by photochemical conversion of light-sensitive agents including dyes, couplers, and the like, could not be erased to permit reuse of the same recording member. For certain important applications where a permanent record of the stored information is unnecessary, it would represent substantial savings in money, effort, and material if a photoradiation-sensitive recording member were made reusable after erasure. It would be further desirable if the recording member could be selectively erased for editing of already stored information.

It is one important object of the invention, therefore, to provide an erasable recording system for producing a visible color image which can be erased generally or selectively by simple means for additional information storage with the same recording member.

It is another important object of the invention to provide a simplified photographic system for producing and erasing a visible image on a suitable recording member solely with energy means.

Still another important object of the invention is to provide a recording system for producing a visible image in a liquid which can be erased for reuse by physical movement of the liquid or other direct simple energy means.

A still further important object of the invention is to provide a reversible color image in a solid recording film which can still be preserved at ordinary ambient conditions of illumination, temperature, and humidity for continued storage.

These and other important objects and advantages of the invention will be apparent from the following description taken in connection with the accompanying drawings in which:

FIGURE 1 represents a perspective view, partially in cross section, of one preferred information storage member of the invention;

FIGURE 2 is a schematic representation illustrating the recording of information in a liquid recording medium according to the invention; and FIGURE 3 is another schematic representation of a recording system for producing an erasable image on a solid recording member.

Briefly, a reversible color image is produced according to the invention by exposing a suspension of a polyhalogenated organic compound in an optically transparent inert suspending medium to activating radiation in the image pattern to be recorded. A reversible color change is produced in those portions of recording medium receiving the radiation. The color products formed upon exposure have a point-by-point correspondence with the projected radiation image thereby representing a faithful reproduction of the information transmitted to the recording medium. Reversal of the color change may be achieved with heating and other energy transfer so that a recording medium may again be restored to an original transparent condition capable of further recording.

A reversible color image is achieved in the above-described manner with a suspension of a polyhalogenated organic compound which forms a reversible chromophore in the suspending medium responsive to photoradiation exposure. Useful polyhalogenated organic compounds for recording have each halogen atom bonded to a carbon atom which has no more than two hydrogen atoms bonded thereto. For reversal of color change in the present recording compositions, the polyhalogenated organic compound and suspending medium must not react chemically or otherwise interact physically to produce non-reversible products from irradiation. Reversibility of color change in recording also requires a suspending medium which itself is "photoradiation inert," the term being used to denote a material which in association with the polyhalogenated organic compound does not itself undergo any substantial self-degradation, color change, or the like, when irradiated.

Reversible color change in polyhalogenated organic materials responsive to photoradiation is hardly expected from past experience with these materials in the graphic arts. More particularly, polyhalogenated alkyl and aryl compounds, such as iodoform and bromo-substituted benzenoid derivatives have been reacted photochemically to liberate halogen atoms which thereafter react with a receptive substance to form permanent color products. Alternately, polyhalogenated organic compounds have been used as photocatalysts to produce localized insolubilization of a resin layer in response to an image pattern of photoradiation. More recently, polyhalogenated organic compounds have been reacted with various amines by photoradiation to produce stable dye images corresponding to the pattern of illumination. The highly permanent character of all these recordings is in marked contrast with the reversible color images produced by irradiation of the present compositions.

The present invention may be practiced in its preferred embodiments as described with respect to the aforementioned drawings. In FIGURE 1 there is shown a suitable recording member 1 which may be in the form of a flexible endless tape for producing a color image which is heat erasable. As shown, the recording member is a composite assembly of a first thin recording layer 2 comprising an optically transparent photoradiation inert thermoplastic organic polymer containing the polyhalogenated organic compound and a second substrate layer 3 of thermally durable material which retains its integrity at the moderately elevated temperatures of erasing the color image. A suitable recording member may be fabricated by depositing a thin film of the normally solid recording material from an organic liquid coating composition on the substrate layer and thereafter evaporating the solvent by known procedure. The substrate material may be optically transparent or opaque, depending upon the particular method to be employed for viewing the color image. More particularly, if an ordinary photograph is desired for visual observation purposes only, the substrate material can be paper, metal, or other opaque substance having the required thermal stability. On the other hand, if it is desired to form a transparency from which prints or projected optical images can thereafter be obtained, the substrate material may be glass, a clear polymer having a higher deformation temperature than the recording layer, or some other light-transparent solid material. It is also within contemplation of the invention to employ an unsupported recording layer since erasure of the color image can be effected in thermoplastic suspending media such as polystyrene at temperatures below the deformation temperature of the polymer.

An approximately 0.002 inch thick solid recording film was obtained by casting a 20 percent solids benzene solution of a commercial polystyrene material containing approximately 2.5 parts by weight iodoform per 20 parts by weight of polystyrene in the solution onto a glass plate and evaporating the benzene. The particular polystyrene material employed had an average molecular weight of approximately 20,000 and a softening temperature of approximately 80° C. Light exposure of the solid recording film through an ordinary image-bearing photographic negative in contact with the film produced a color copy of the image contained on the negative. The film assembly was exposed to illumination emitted from a conventional 300-watt tungsten filament lamp located approximately four inches from the negative for approximately 30 seconds. Those portions of the recording film receiving illumination through the negative were converted selectively to a light brown or orange color from the transparent yellow coloration of the original member. Heating the exposed recording film in air for ten minutes at 80° C. removed the image and restored the film to the original yellow color. Additional recording on the member followed by erasure for a total of four cycles at the mentioned conditions did not noticeably lower the quality of the color image.

Heat erasure of a color image at temperatures below the fusion point of the thermoplastic medium produces surface deformations on the film corresponding to the image pattern. While continued heating of the thermoplastic for short periods at the fusion temperature removes all deformation, an alternate recording process may be followed which prevents any occurrence of deformation. Exposure of the color image before erasure to a uniform field of radiation at intensities comparable to the original recording prevents any subsequent selective deformation of the treated member. The modified recording process which includes intervening uniform irradiation can be used for applications such as optical displays wherein different visible images are to be sequentially copied on the same recording media for projection therefrom.

In FIGURE 2 there is shown schematically a recording system for producing an erasable color image in a liquid recording member which includes means for erasure simply by causing physical movement in the liquid. The recording system 4 comprises liquid recording member 5 having an organic liquid solution of the polyhalogenated organic compound 6 contained in an optically transparent cell member 7, photoradiation means 8 for exposing the liquid to activating radiation in the desired image pattern of recording, and mechanical agitation means 9 for producing physical movement in the liquid to erase the image. The geometrical shape of recording member 5 is not deemed critical for establishing an image in the liquid and a simple straight wall chamber has been depicted for simplicity of illustration. It will be apparent from the hereinafter recited method of recording that different container means for the liquid, even including a plurality of chambers can be employed wherever desirable. Photoradiation means 8 may consist of a simple lamp source 10 to supply the activating radiation in association with transparent image bearing means 11 for projecting a radiation image into the liquid recording medium. This may be accomplished as shown by interposition of an ordinary photographic negative having an image to be copied in the beam of illumination provided by the lamp member. It is obviously contemplated to employ more complex optical systems for radiation projections which may include additional elements such as focusing lenses, reflection mirrors, and the like, whenever useful. While no specific apparatus means for projecting the color image formed in the liquid has been shown for simplicity of illustration, there exist many available transmissive and reflective optical projectors for this purpose. To illustrate but one optical readout system suitable for projecting the image formed in the liquid onto a remote viewing surface, an ordinary photographic projector may be disposed on side 12 of the optically transparent cell member 7. Projection of a horizontal light beam from the projector through the liquid onto a viewing surface disposed on the opposite side of cell member 7 will reproduce the details of an image appearing in the cell.

Recording in liquid media of the invention may be achieved substantially as depicted in the FIGURE 2 drawing. Accordingly, selective illumination of a benzene solution containing 5 percent iodoform by weight in cell 7 resulted in a reversible image. A vertical reproduction of the illumination pattern projected from a 300-watt tungsten lamp located approximately six inches from the cell wall was visibly discernible after a three-minute exposure.

The color image formed as above described appears restricted to a volume element of solution nearest the wall of the container member receiving the photoradiation. As in conventional photochemical reactions, the color intensity and volume reacted are functions of light energy, light intensity, and concentration of photosensitive ingredients. The phenomenon facilitates erasure of the image which may be achieved with virtually little physical movement of the recording liquid. Mechanical agitation means 9 for erasing the color image may consist simply of a stirrer with a motor drive (not shown) to minimize physical effort by an operator during the recording process. Alternately, ordinary finger tapping of cell member 7 has proven adequate to break up a color image for restoration of the recording liquid. While the exact mechanism of erasing a liquid image is not known with precision at the present time, it is deemed to involve more than mere dispersion of color products in the medium. Since repeated recording with the same liquid produces images substantially as good as the original one obtained, the erasure must involve a chemical reversal of the chromophoric products generated in recording. Further evidence of an actual chemical reversal produced by erasure is lack of any new optical absorption peaks in the recording liquid after image erasure when compared with the original liquid by spectrophotometric analysis.

The resolution capability of recording for both of the above-described embodiments is theoretically on a molecular level so that microfilm and 800-line per inch test patterns are readily reproduced with sharpness and clarity in both liquid and solid recording media. Likewise, the color images produced in both type media exhibit full shade tones or "gray scale" so as to be generally useful in graphic arts applications. Comparative gray scale measurements made on a solid recording member comprising a 20 percent dispersion of iodoform in polystyrene resulted in at least eight steps of gray scale being observed when compared with an Eastman Kodak Photographic Steptable Model 1A having an optical density range of 0.05–3.05. Further analysis of color reversibility by spectrographic light absorption measurement for a solid recording member composed of a 20 percent by weight iodoform dispersion in polystyrene bear out a substantial return of original absorption characteristics after erasure. While this is not to say that all original absorption characteristics are restored after erasure since some shift in the main absorption peak is still noted, there is absence of strong new absorption bands that would indicated progressive formation of a non-reversible color shift in the recording material.

It is apparent from the preceding description that the present recording compositions are generally useful photographic materials by reason of photosensitivity in the visible spectrum. In illustration, photoradiation intensities of 0.9 mw./cm.$^2$ with a General Electric H4AB lamp located at a distance of six inches from the recording member for thirty seconds produces a readily visible color image in a recording composition containing 20 percent iodoform by weight in polystyrene. Some loss in image contrast does occur from an overly long exposure of the recording member to daylight. Thus, storage of an image bearing recording member in ordinary daylight environment produces gradual darkening in previously unexposed portions of the recording medium which obscures the contrast of a recorded image. This result may be circumvented by providing a coating for the film which does not transmit the activating radiation.

Useful polyhalogenated organic compounds for preparation of the present recording members may be selected from a relatively broad class of photosensitive carbon-to-carbon bonded compounds containing at least two halogen atoms, with each halogen atom being bonded to a carbon atom having no more than two hydrogen atoms and preferably a single hydrogen atom bonded thereto. Useful photosensitive compounds may further be characterized as producing photolytic halogen when exposed to the activating radiation which results in formation of a reversible chromophore in the recording compositions. Typical polyhalogenated organic compounds which behave in the desired manner include substituted alkyl hydrocarbons such as iodoform, methylene iodide, and tetraiodoethylene; and substituted mononuclear aromatic compounds such as chloranil. The preferred polyhalogenated organic compounds are alkyl hydrocarbons having a plurality of halogen atoms bonded to the same carbon atom which are also readily soluble in both the liquid and solid suspending media useful for preparation of a recording member. Solution of the polyhalogenated organic compound in a suspending medium achieves greater resolution capability in the final recording member. The preferred polyhalogenated organic compounds are also sensitive to photoradiation in the visible spectrum so as to permit photocopying and the like, using ordinary sources of illumination. The preferred materials also exhibit faster response to photoradiation and for a given exposure period yield a color image having more gray scale than other photosensitive polyhalogenated organic compounds. Iodoform exhibits all of the aforementioned desirable characteristics as well as being a less volatile material at elevated erasing temperatures than many other polyhalogenated alkyl hydrocarbons.

Solid recording compositions containing above about 25 parts by weight of the preferred soluble polyhalogenated organic compounds per 100 parts of the polymeric dispersing medium may exhibit certain undesirable rheological characteristics for general purpose application. More particularly, polymers are plasticized sufficiently with soluble polyhalogenated organic compounds at greater concentrations than indicated that objectionable room temperature flow and tackiness generally occurs. While this result does not prevent image formation or erasure in a recording member, reusability of the medium is lessened from a practical standpoint. The special handling equipment and storage conditions necessary to process a recording member exhibiting undesirable flow characteristics make it advisable generally to maintain the concentration of a light-sensitive agent in the composition below the indicated level. On the other hand, liquid recording compositions of the invention are obviously not correspondingly limited by any of the foregoing considerations. The minimum desirable concentration of polyhalogenated organic compound in either liquid or solid recording compositions is limited only by the amount effective to produce perceptible color change responsive upon irradiation. Concentrations as low as 5.0 parts by weight of the light-sensitive agent per 100 parts of the dispersing medium have produced a visibly discernible image.

Suitable suspending media for the polyhalogenated organic compound can be selected from a diverse class of materials including liquids and solids which are optically transparent to the activating radiation and do not react chemically or otherwise interact with the light sensitive agent during the recording process. Preferred liquid suspending media are organic liquid solvents for the polyhalogenated organic compounds which include many aromatic hydrocarbons, alcohols, petroleum products, and other organic liquids. Preferred solid suspending media for a recording member are synthetic organic polymers which are also film-formers so as to facilitate preparation of supported and nonsupported type recording members. The preferred polymers are also solvents for the polyhalogenated organic compound to permit dispersion of the organic compound on a molecular level for greater resolution capability of recording. The especially preferred suspending polymers are thermoplastics which also exhibit greater flexibility generally than thermoset polymers. Useful thermoplastics exhibiting all the desirable characteristics above recited may be selected from the general class of known solid synthetic organic polymers including acetals, acrylics, polyesters, and vinyl resins. Obviously, mixtures of thermoplastic organic polymers having these properties are also useful.

Other solid recording compositions within contemplation of the invention are listed in the following table, together with suitable conditions of recording.

TABLE

| Suspending Polymer | Polyhalogenated Organic Compound | Parts Organic Compound per 100 parts Suspending Polymer | Type of Radiation | Exposure Periods (min.) |
| --- | --- | --- | --- | --- |
| Polystyrene | Methylene iodide | 100 | Visible | 20 |
| Do | Tetraiodo ethylene | 10 | do | 1 |
| Methylmethacrylate | Chloranil | 7 | do | 0.5 |

The color image produced in each of the above-recited recording compositions was erased by heating the film to around 80° C. for periods of approximately 10 minutes.

In FIGURE 3 there is shown a recording system 13 for producing an erasable color image which includes solid recording member 14, photocopying means 15 for exposing the recording member to activating radiation in the desired image pattern, and infrared heating means 16 for erasing the image produced upon irradiation. Advantageously, the recording system also includes photoradiation energy means associated with the heating means for uniform irradiation of the recording before erasure. Obviously, a single radiation source is contemplated for both selective irradiation and uniform irradiation using available apparatus means in the recording system. Known structural arrangements for moving the location of the energy source with a fixed-location recording member or, alternately, moving the location of the recording member with a fixed-location energy source may be used for this purpose.

The entire recording apparatus may conveniently be housed in a single enclosed chamber 17 having entrance means (not shown) for inserting a recorded image to be copied adjacent the recording member. Alternately, a conventional camera device equipped with shutter means for exposing the recording member to an optical image located outside the enclosure may be employed for recording. In the particular arrangement of the embodiment, recording member 14 is positioned in the chamber to receive an optical image projected from photocopying means 15 by passing a beam of visible light emitted from lamp source 18 through transparent photographic negative 19 containing the information to be recorded. If photoradiation energy other than in the visible spectrum is required to form a color image because of the light sensitivity characteristics for the particular recording member employed, a secondary means of illumination 20 can be employed to expose the recording member selectively. The latter arrangement permits use of lamp source 18 as the means for subsequently projecting the recorded image to a remote viewing surface in a manner to be more fully described hereinafter. Heating means 16 shown in FIGURE 3, as an ordinary infrared lamp, may be positioned suitably in the recording chamber behind the negative being copied. Viewing window 21 is located in the rear wall of recording chamber 17 to allow optical projection of the color image from the chamber to exterior viewing surface 22. Projection of a color image from the recording member may be made with conventional transmissive optical means wherein a beam of visible light 23 is transmitted through the optically transparent recording member 14, thereby outlining the color image in the emerging beam 24. A concentrating optical lens 25 may be suitably disposed in the path of the emerging light beam in order to produce an image on the viewing surface having sharper definition and clarity.

From the foregoing description, it will be apparent that a system of recording information which permits reuse of the same recording medium has been disclosed. Additionally, a system for recording in both solid and liquid recording media has been disclosed wherein erasure of a reversible color image is accomplished solely by energy means particularly to the type recording media employed. It is not intended to limit the invention to the preferred embodiments above shown, however, since certain modifications of the present teachings can be made without departing from the true spirit and scope of the invention. For example, it is contemplated to employ known light-sensitizers in minor amounts for the purpose of decreasing the exposure time of recording as well as broadening the spectral response region of the recording composition. Organic base materials, such as triphenylamine and p-phenylazoaniline at concentration levels in the recording composition of about 0.3 mole of sensitizer per mole of the polyhalogenated organic compound have already been found to increase the sensitivity and spectral response of recording. The result is achieved without destroying the reversibility of the photochemical color reaction in both liquid and solid recording systems. An advantage for incorporating these phosensitizers in liquid recording compositions is that erasure of a color image is obtained with removal of the activating radiation.

While the specific activating photoradiation employed to record images in the above embodiments has been either in the utraviolet or visible regions of the spectrum for convenience and economy of operation, it is contemplated to employ other radiation including infrared light, X-rays, gamma rays, and ionizing radiation depending upon the sensitivity characteristics of the particular recording composition. It is still further contemplated to employ other enregy means for erasure of the recorded image depending upon the reversibility characteristics of the particular recording composition employed including erasure with longer wavelength electromagnetic radiation than the photoradiation energy utilized to induce color change. For example, it has been shown in the preceding examples that infrared radiation is effective to erase images formed with ultraviolet or visible radiation. It is intended to limit the present invention, therefore, only to the scope of the following claims.

What we claim as new and desire to secure by Letters Patent of the United States is:

1. A recording apparatus for producing a reversible color image on a solid recording member which comprises a recording member comprising an optically transparent photoradiation-inert and non-halogen receptive solid polystyrene containing in solution from about 5 weight percent up to the limit of solubility of a polyhalogenated organic compound which forms a heat-reversible chromophore in the polystyrene responsive to photoradiation, the polyhalogenated organic compound being selected from the group consisting of iodoform, methylene iodide, tetraiodoethylene and chloranil, said polyhalogenated compound being the sole light-sensitive color imparting material in the recording member, photoradiation energy means for selectively exposing the recording member to activating radiation in the desired image pattern to be recorded in order to produce a color image therein, and heating means associated with the recording member for erasing the color image.

2. A recording apparatus for producing a reversible color image in a liquid recording member which comprises a recording member comprising a contained mass of optically transparent photoradiation-inert and non-halogen receptive organic liquid solvent containing in solution from about 5 weight percent up to the limit of solubility of a polyhalogenated organic compound which forms a reversible chromophore in the solvent responsive to photoradiation, the polyhalogenated organic compound being selected from the group consisting of iodoform, methylene iodide, tetraiodoethylene and chloranil, said polyhalogenated compound being the sole light-sensitive color imparting material in the recording member, photoradiation means for exposing the recording member to activating radiation in the image pattern to be recorded in order to produce a visible color image therein, and means for producing physical movement in the mass of organic liquid solvent whereby the color image is erased.

3. An information recording process for producing an erasable color image which comprises exposing a recording member to activating photoradiation in the image pattern to be recorded for a sufficient time period to produce a color image, the recording member comprising an optically transparent photoradiation-inert and non-halogen receptive suspending liquid medium containing from about 5 percent by weight up to the limit of solubility of a soluble polyhalogenated organic compound which forms a reversible chromophore in the suspending medium responsive to the photoradiation, the polyhalogenated organic compound being selected from the group consisting of iodoform, methylene iodide, tetraiodoethylene, and chloranil, said polyhalogenated compound being the sole light-sensitive color imparting material in the recording member.

4. An information recording process for reversibly producing a color image which comprises exposing a liquid recording member to activating photoradiation in the image pattern to be recorded for a sufficient time period to produce the color image, the liquid recording member comprising an optically transparent photoradiation-inert and non-halogen receptive liquid solvent containing from about 5 weight percent up to the limit of solubility of a dissolved polyhalogenated organic compound which forms a reversible chromophore in the solvent responsive to the photoradiation, the polyhalogenated organic compound being selected from the group consisting of iodoform, methylene iodide, tetraiodoethylene and chloranil, said polyhalogenated compound being the sole light-sensitive color imparting material in the recording member, and producing sufficient movement of the liquid recording member to erase the color image.

5. An information recording process for producing an erasable color image which comprises exposing a recording member to activating photoradiation in the image pattern to be recorded for a sufficient time period to produce a color image, the recording member comprising an optically transparent photoradiation-inert and nonhalogen receptive solid polystyrene film containing in solution from about 5 percent by weight up to the limit of solubility of a polyhalogenated organic compound which forms a heat-reversible chromophore in the polymer film responsive to the photoradiation, the polyhalogenated organic compound being selected from the group consisting of iodoform, methylene iodide, tetraiodoethylene and chloranil, said polyhalogenated compound being the sole light-sensitive color imparting material in the recording member.

6. An information recording process for reversibly producing a color image which comprises exposing a solid recording member to activating photoradiation in the image pattern to be recorded for a sufficient time period to produce a color image, the recording member comprising an optically transparent photoradiation inert and nonhalogen receptive suspending solid polystyrene containing in solution from about 5 percent by weight up to the limit of solubility of a polyhalogenated organic compound which forms a reversible chromophore in the suspending solid polystyrene responsive to the photoradiation, the polyhalogenated organic compound being selected from the group consisting of iodoform, methylene iodide, tetraiodoethylene and chloranil, said polyhalogenated compound being the sole light-sensitive color imparting material in the recording member, further exposing the recording member to a uniform pattern of the activating photoradiation, and heating the exposed recording member to a temperature below that at which said compound undergoes significant sublimation for a time sufficient to erase said color image and restore said recording member to a condition substantially identical to its condition prior to said exposure.

References Cited

UNITED STATES PATENTS

| | | | |
|---|---|---|---|
| 2,099,297 | 11/1937 | Clement | 96—115 |
| 3,082,086 | 3/1963 | Sprague | 96—90 |
| 3,201,240 | 8/1965 | Faber | 96—48 |
| 3,268,333 | 8/1966 | Allman et al. | 96—48 |
| 2,233,429 | 3/1941 | Ostromislensky | 96—89 |
| 3,022,318 | 2/1962 | Berman et al. | 88—106 |
| 3,114,836 | 12/1963 | Fergason et al. | 88—106 |
| 2,945,305 | 7/1960 | Strickler | 88—106 |
| 3,114,635 | 12/1963 | Fidelman | 96—89 |

OTHER REFERENCES

Wood et al.: "General College Chemistry," Harper Publishing Co., 1957, Libr. Cong. Cat. No. 57–6262, pp. 56–58 relied on.

J. TRAVIS BROWN, *Acting Primary Examiner.*

NORMAN G. TORCHIN, *Examiner.*

A. L. LIBERMAN, C. E. DAVIS, *Assistant Examiners.*